United States Patent
Surace et al.

(10) Patent No.: US 11,674,448 B2
(45) Date of Patent: Jun. 13, 2023

(54) SEAL SYSTEM HAVING SILICON LAYER AND BARRIER LAYER

(71) Applicant: RAYTHEON TECHNOLOGIES CORPORATION, Farmington, CT (US)

(72) Inventors: Raymond Surace, Newington, CT (US); Brian T. Hazel, Avon, CT (US); Robert A. White, III, Meriden, CT (US); Zhongfen Ding, South Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/377,591

(22) Filed: Jul. 16, 2021

(65) Prior Publication Data

US 2023/0019497 A1  Jan. 19, 2023

(51) Int. Cl.
   *F01D 11/00* (2006.01)
   *F02C 7/28* (2006.01)
   (Continued)

(52) U.S. Cl.
   CPC .............. *F02C 7/28* (2013.01); *F01D 11/001* (2013.01); *F01D 11/005* (2013.01); *F01D 11/08* (2013.01);
   (Continued)

(58) Field of Classification Search
   CPC ........ F01D 11/001; F01D 11/005; F02C 7/28; F05D 2240/35; F05D 2240/55
   See application file for complete search history.

(56) References Cited

U.S. PATENT DOCUMENTS 3,928,906 A * 12/1975 Good .................. F02C 7/28
                                                    148/276
4,109,031 A *  8/1978 Marscher .......... C04B 37/026
                                                    415/173.1
(Continued)

FOREIGN PATENT DOCUMENTS

EP      1693478      8/2006
EP      2963250      1/2016
(Continued)

OTHER PUBLICATIONS

European Search Report for European Patent Application No. 22185191.8 mailed Dec. 15, 2022.

*Primary Examiner* — Igor Kershteyn
*Assistant Examiner* — Theodore C Ribadeneyra
(74) *Attorney, Agent, or Firm* — Carlson, Gaskey & Olds, P.C.

(57) ABSTRACT

A seal system includes a ceramic component, a metallic component, a silicon-containing layer, and a barrier layer. The ceramic component has a first surface region that defines a first surface roughness. The metallic component is situated adjacent to the first surface region and has a second surface region facing the first surface region. The silicon-containing layer is on the first surface region of the ceramic component and has a contact surface that defines a second surface roughness which is less than the first surface roughness. The barrier layer is on the metallic component and in contact with the silicon-containing layer and serves to limit interaction between silicon of the silicon-containing layer and the metallic component. The barrier layer includes at least one of alumina or MCrAlY.

15 Claims, 2 Drawing Sheets

(51) Int. Cl.
*F01D 11/08* (2006.01)
*F02C 3/04* (2006.01)
*F16J 15/16* (2006.01)

(52) U.S. Cl.
CPC ................. *F02C 3/04* (2013.01); *F16J 15/16* (2013.01); *F05D 2220/32* (2013.01); *F05D 2240/35* (2013.01); *F05D 2240/55* (2013.01)

(56) References Cited

U.S. PATENT DOCUMENTS

| | | | | |
|---|---|---|---|---|
| 4,481,237 A * | 11/1984 | Bosshart | ................ | C23C 4/11 |
| | | | | 428/678 |
| 4,763,828 A * | 8/1988 | Fukaya | ................ | C04B 37/026 |
| | | | | 228/124.1 |
| 5,082,161 A * | 1/1992 | Utida | ................ | C04B 37/026 |
| | | | | 228/262.2 |
| 5,279,909 A * | 1/1994 | Horner | ................ | H01M 50/186 |
| | | | | 29/623.2 |
| 5,498,484 A | 3/1996 | Duderstadt | | |
| 5,601,932 A * | 2/1997 | Krum | ................ | B23K 20/233 |
| | | | | 428/629 |
| 6,413,589 B1 * | 7/2002 | Li | ................ | C22C 49/14 |
| | | | | 427/419.7 |
| 8,167,191 B2 * | 5/2012 | Warrier | ................ | B23K 35/0238 |
| | | | | 228/122.1 |
| 9,365,725 B2 * | 6/2016 | Sarrafi-Nour | ................ | C09D 5/00 |
| 9,890,089 B2 * | 2/2018 | Kirby | ................ | C23C 4/134 |
| 10,100,656 B2 | 10/2018 | Bancheri et al. | | |
| 10,808,553 B2 | 10/2020 | Whittle et al. | | |
| 11,060,192 B2 * | 7/2021 | Hirano | ................ | C04B 37/026 |
| 2010/0227146 A1 * | 9/2010 | Larose | ................ | C23C 28/36 |
| | | | | 428/312.8 |
| 2011/0027517 A1 * | 2/2011 | Kirby | ................ | C04B 41/009 |
| | | | | 427/336 |
| 2011/0027557 A1 * | 2/2011 | Kirby | ................ | C04B 41/89 |
| | | | | 428/428 |
| 2012/0099972 A1 * | 4/2012 | Guo | ................ | C23C 30/00 |
| | | | | 427/454 |
| 2012/0099985 A1 * | 4/2012 | Strock | ................ | F16J 15/445 |
| | | | | 415/230 |
| 2014/0261080 A1 * | 9/2014 | Lee | ................ | C23C 14/30 |
| | | | | 427/596 |
| 2015/0267058 A1 * | 9/2015 | Lee | ................ | C04B 41/009 |
| | | | | 428/335 |
| 2016/0214907 A1 * | 7/2016 | Shim | ................ | C04B 35/573 |
| 2016/0236995 A1 * | 8/2016 | Lai | ................ | B32B 18/00 |
| 2016/0251976 A1 * | 9/2016 | Strock | ................ | C23C 4/134 |
| | | | | 277/411 |
| 2018/0010469 A1 * | 1/2018 | Kadau | ................ | F01D 5/186 |
| 2018/0030993 A1 * | 2/2018 | Strock | ................ | C23C 4/067 |
| 2018/0066527 A1 * | 3/2018 | Kadau | ................ | F01D 11/122 |
| 2018/0128317 A1 * | 5/2018 | Horchheimer | ................ | F16B 33/62 |
| 2018/0230842 A1 * | 8/2018 | Liu | ................ | F01D 11/122 |
| 2018/0320270 A1 * | 11/2018 | Nardi | ................ | C23C 28/3215 |
| 2019/0032503 A1 * | 1/2019 | Shi | ................ | F01D 11/122 |
| 2019/0078215 A1 * | 3/2019 | Wessels | ................ | C23C 4/134 |
| 2019/0093497 A1 * | 3/2019 | Ndamka | ................ | C04B 41/5024 |

FOREIGN PATENT DOCUMENTS

| | | |
|---|---|---|
| EP | 3626934 | 3/2020 |
| FR | 3101642 | 4/2021 |
| WO | 02062519 | 8/2002 |

\* cited by examiner

SEAL SYSTEM HAVING SILICON LAYER AND BARRIER LAYER

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature gas flow. The high-pressure and temperature gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs for airfoils.

SUMMARY

A seal system according to an example of the present disclosure includes a ceramic component that has a first surface region defining a first surface roughness, a metallic component situated adjacent the first surface region, and a silicon-containing layer on the first surface region of the ceramic component. The silicon-containing layer has a contact surface defining a second surface roughness that is less than the first surface roughness. There is a barrier layer on the metallic component that is in contact with the silicon-containing layer. The barrier layer limits interaction between silicon of the silicon-containing layer and elements of the metallic component, and the barrier layer includes an oxide.

In a further embodiment of any of the foregoing embodiments, the oxide is selected from the group consisting of alumina and chromia.

In a further embodiment of any of the foregoing embodiments, the barrier layer is a monolayer, the silicon-containing layer has a first thickness, the barrier layer has a second thickness, and the first thickness is greater than the second thickness.

In a further embodiment of any of the foregoing embodiments, the barrier layer is alumina.

In a further embodiment of any of the foregoing embodiments, the barrier layer is chromia.

In a further embodiment of any of the foregoing embodiments, the barrier layer includes first and second sub-layers, and the first sub-layer is MCrAlY or aluminide and the second sub-layer is a partially or fully stabilized zirconia, hafnia, or titania.

In a further embodiment of any of the foregoing embodiments, the second sub-layer is yttria stabilized zirconia.

In a further embodiment of any of the foregoing embodiments, the second sub-layer is yttria stabilized hafnia.

In a further embodiment of any of the foregoing embodiments, the second sub-layer is yttria stabilized titania.

A gas turbine engine according to an example of the present disclosure includes a compressor section a combustor in fluid communication with the compressor section, a turbine section in fluid communication with the combustor, and at least one sealing system in the turbine section or the combustor. The sealing system includes a ceramic component that has a first surface region defining a first surface roughness, a metallic component situated adjacent the first surface region, and a silicon-containing layer on the first surface region of the ceramic component. The silicon-containing layer has a contact surface defining a second surface roughness that is less than the first surface roughness. There is a barrier layer on the metallic component that is in contact with the silicon-containing layer. The barrier layer limits interaction between silicon of the silicon-containing layer and elements of the metallic component, and the barrier layer includes an oxide.

In a further embodiment of any of the foregoing embodiments, the oxide is selected from the group consisting of alumina and chromia.

In a further embodiment of any of the foregoing embodiments, the barrier layer is a monolayer.

In a further embodiment of any of the foregoing embodiments, the silicon-containing layer has a first thickness and the barrier layer has a second thickness, and the first thickness is greater than the second thickness.

In a further embodiment of any of the foregoing embodiments, the barrier layer includes first and second sub-layers, and the first sub-layer is MCrAlY or aluminide and the second sub-layer is a partially or fully stabilized zirconia, hafnia, or titania.

In a further embodiment of any of the foregoing embodiments, the second sub-layer is yttria stabilized zirconia.

In a further embodiment of any of the foregoing embodiments, the second sub-layer is hafnia.

In a further embodiment of any of the foregoing embodiments, the second sub-layer is titania.

A seal system according to an example of the present disclosure includes a ceramic component that has a first surface region defining a first surface roughness, a metallic seal situated adjacent the first surface region, and a silicon-containing layer on the first surface region of the ceramic component. The silicon-containing layer has a contact surface defining a second surface roughness that is less than the first surface roughness. There is a barrier layer on the metallic seal that is in contact with the silicon-containing layer. The barrier layer limits interaction between silicon of the silicon-containing layer and elements of the metallic seal, and the barrier layer includes at least one of alumina or chromia.

In a further embodiment of any of the foregoing embodiments, the barrier layer is a monolayer.

In a further embodiment of any of the foregoing embodiments, the barrier layer includes first and second sub-layers, and the first sub-layer is MCrAlY or aluminide and the second sub-layer is a partially or fully stabilized zirconia, hafnia, or titania.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
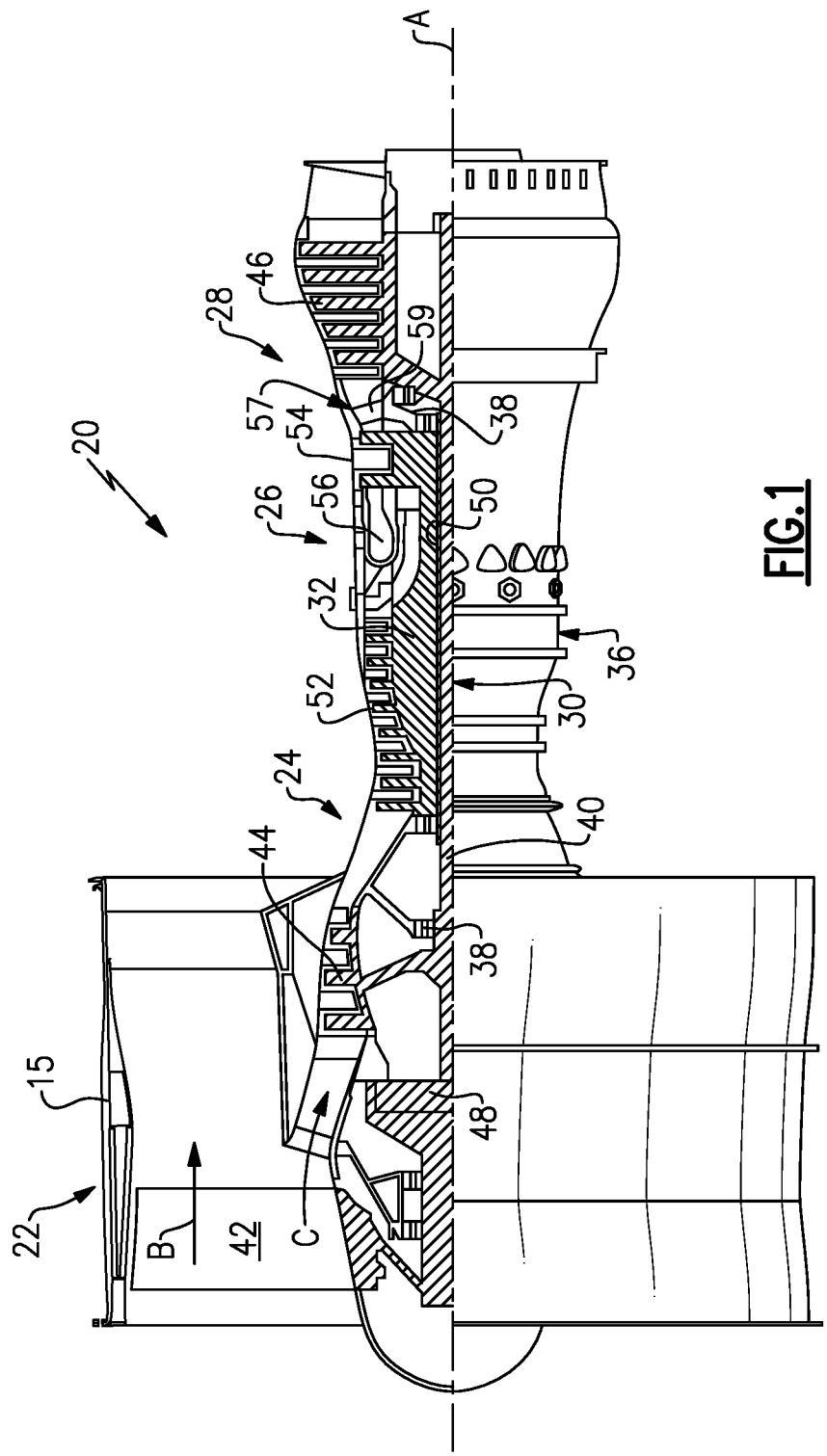
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2A:
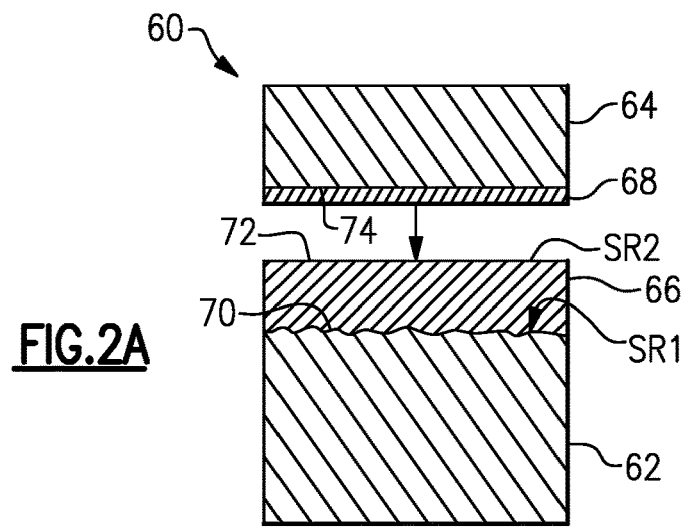
FIG. 2A illustrates an example seal system (in a non-sealed state) that has a silicon layer and a barrier layer.

FIG. 2A illustrates a sectioned view of a representative portion of a seal system 60 of the engine 20. As examples, the seal system 60 may be implemented in the turbine section 28 in association with a turbine vane, a turbine blade, or a blade outer air seal, or in other components in the engine 20 that are exposed to high temperatures, such as the combustor section 26. The seal system 60 includes a ceramic component 62 and a metallic component 64, which is formed of a superalloy such as a nickel- or cobalt-based superalloy. As will be appreciated, FIG. 2A is representative and the actual geometry of the components will vary depending on the particular implementation. In one example, the metallic component 64 is a feather seal, which is a thin, generally uniform thickness strip of metal. It is to be understood, however, that the metallic component 64 can alternatively be a component other than a feather seal, such as an adjacent component that serves other functions in addition to sealing.

The ceramic component 62 is formed of a monolithic ceramic, a ceramic matrix composite (CMC), or a combination of monolithic ceramic and CMC. The monolithic ceramic may be, but is not limited to, silicon nitride or silicon carbide. A CMC has ceramic fiber tows that are disposed in a ceramic matrix. The CMC may be, but is not limited to, a SiC/SiC CMC in which SiC fiber tows are disposed within a SiC matrix. A fiber tow is a bundle of filaments. As an example, a single tow may have several thousand filaments. The tows may be arranged in a fiber architecture, which refers to an ordered arrangement of the tows relative to one another, such as, but not limited to, a 2D woven ply or a 3D structure.

The ceramic component 62 includes a first surface region 70, which is a surface area of the ceramic component 62 at which the ceramic component 62 seals with the metallic component 64. Most typically, this will be on the backside of the ceramic component 62 rather than facing into in the core gaspath of the engine 20. The gaspath surfaces of a turbine component are often heavily contoured for performance and/or to reduce un-steady pressures which can have a negative impact on the life of adjacent components. This contouring, when mirrored on the non-gaspath surfaces of a ceramic component, such as by the ply layup of a CMC, can significantly impact the ability to achieve an effective seal even with a ductile metallic seal. Just as critical for sealing is the surface finish of the ceramic component. The first surface region 70 defines a first surface roughness SR1. As used herein, surface roughness refers to surface roughness Ra (typically in micrometers). Surface roughness Ra can be measured using known profilometer or structured light scan equipment and methods. For a CMC, although the fiber tows are embedded in the matrix, the matrix may not completely smooth over the fiber tows. As a result, in comparison to surfaces of metallic components, the surface is relatively rough and "wavy" from protrusion of the tows. A monolithic ceramic may not be as rough or wavy as a CMC but still has a relatively rough surface in comparison to metallic components. This roughness, represented by the first surface roughness SR1, presents a challenge to sealing because a mating seal, e.g., the metallic component 64, does not conform to the surface roughness, thereby leaving small gaps that may provide pathways for leakage. Moreover, it is undesirable to machine the first surface region 70 of the ceramic component 62 to be smooth, as machining would expose and damage the fiber tows and plies. The roughness is also a challenge to meeting geometric flow path requirements. For instance, the position of a gaspath side of a CMC component may be determined by the location of the non-gaspath surface against a mating component. Therefore, if the ceramic component 62 were to have a relatively high roughness at the non-gaspath side, then there would be a greater potential for variation in the position of the gaspath side.

Figure 2B:
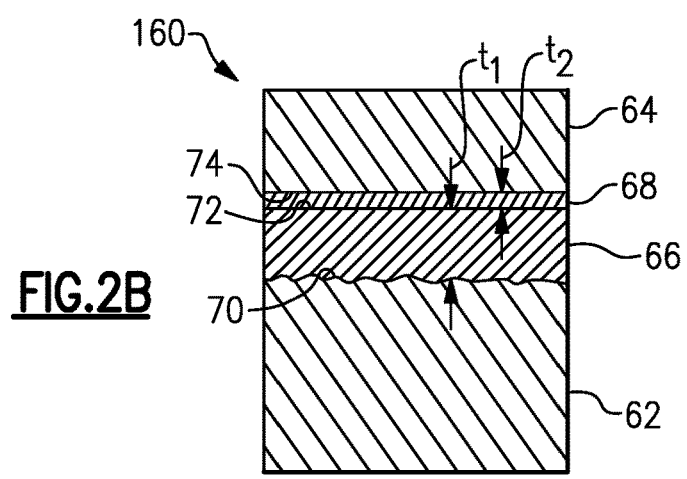
FIG. 2B illustrates the seal system of FIG. 2A but in a sealed state.

In these regards, a silicon-containing layer 66 is provided on the first surface region 70 and serves to fill-in the roughness and smooth the surface of the ceramic component 62 in order to facilitate sealing. For example, the silicon-containing layer 66 is deposited by known deposition techniques, such as but not limited to thermal spray, and then machined to a second surface roughness SR2 that is less than the first surface roughness SR1. As an example, the first surface roughness SR1 is greater than 800 Ra and the second surface roughness SR2 is less than 200 Ra. In comparison to the hard ceramic of the ceramic component 62, the silicon-containing layer 66 is relatively soft and can be readily machined, such as by milling, grinding, or ultrasonic impact machining. The top, machined surface of the silicon-containing layer 66 then serves as a contact surface 72 for sealing with the metallic component 64. In general, the silicon-containing layer 66 has a thickness of up to about 1500 micrometers, such as 10 micrometers or 250 micrometers. The thickness may be selected in accordance with the desired adherence with the ceramic component 62 and to provide a sufficient amount of material that can be removed in order to meet dimensional requirements of the flow path geometry. FIG. 2A illustrates the system 60 prior to sealing between the metallic component 64 and the ceramic component 62, and FIG. 2B illustrates the system 60 in a sealed state. In one example, the silicon-containing layer 66 is pure or substantially pure silicon.

While the contact surface 72 provides a smooth surface for sealing, if the metal of the metallic component 64 were to be in direct contact with silicon of the silicon-containing layer 66, the silicon may migrate and intermix with elements of the metallic component 64, such as nickel or cobalt, to form relatively low melting temperature eutectic phases. For instance, Ni—Si and Co—Si eutectic phases begin at around 965° C. and 1193° C., respectively. The melting temperatures of these eutectic phases are generally lower than the melting temperature of the superalloy of the metallic component 64. Therefore, eutectic formation may reduce thermal stability and durability.

In this regard, a barrier layer 68 is provided on the metallic component 64 to limit or stop interaction between the silicon of the silicon containing layer 66 and the elements of the metallic component 64. As shown in FIG. 2B, the metallic component 64 is situated adjacent the ceramic component 62 and includes a second surface region 74 that faces toward the ceramic component 62. In this example, the barrier layer 68 is a monolayer that is disposed on the second surface region 74. In the sealed state, the barrier layer 68 contacts the contact surface 72 of the silicon-containing layer 66 to provide an airtight or substantially airtight seal. In this regard, the second surface region 74 is relatively smooth and has a roughness of less than 200 Ra.

The barrier layer 68 can be provided as a thermally grown layer or as a deposited coating. For instance, if the selected superalloy is readily oxidizable at applicable engine temperatures, the barrier layer 68 can be thermally grown via thermal pre-treatment. As an example, some cobalt-based superalloys that contain relatively high levels of chromium are oxidizable, such as but not limited to, the superalloys known as MAR-M-509, Haynes 188, or Haynes 25. Chromium, and possibly some alloying elements of the superalloy, react with oxygen at high temperatures to develop an oxide scale, such as chromia, as the barrier layer 68. The oxide scale can be grown as part of the fabrication process of the metallic component 64 by heat treating the metallic component in an oxygen-containing chamber prior to use in the engine, or alternatively grown in-situ in the engine 20 from elevated temperatures and oxygen exposure during engine operation. Mechanical forces, erosion, or other factors may cause loss of portions of the barrier layer 68. However, if the selected superalloy is readily oxidizable, barrier layer 68 will re-grow.

If the oxide scale formed by the superalloy metallic component 64 is not robust enough in terms of its durability under the conditions of the use environment, the barrier layer 68 can instead be deposited onto the metallic component 64 prior to its use in the engine 20. For example, an MCrAlY or aluminide coating (including platinum modified aluminides) coating is deposited, and machined or otherwise made flat and smooth, and then thermally treated to produce an alumina scale as the barrier layer 68. For MCrAlY, M is at least one of cobalt (Co), nickel (Ni), or iron (Fe), Cr is chromium, Al is aluminum, and Y is yttrium. In a further example, the metallic component 64 is a nickel-based superalloy that includes single crystal nickel and the MCrAlY is deposited by, but is not limited to, physical vapor deposition, magnetron sputtering, air plasma spray, vacuum plasma spray, cathodic arc deposition, pack cementation, or chemical vapor deposition. As will be described further below, if an enhanced barrier is desired, an additional oxide layer, such as yttria-stabilized zirconia ("YSZ"), can be deposited to form a dual-layer barrier.

As shown in FIG. 2B, the silicon-containing layer 66 has a first thickness ($t_1$) and the barrier layer 68 has a second thickness ($t_2$). As the barrier layer 68 is present to mainly block interaction between the silicon and the metal, the barrier layer 68 need only be thick enough to block the silicon over the time frame and temperature of use. In general, the barrier layer 68 can be thin in comparison to the silicon-containing layer 66. In one example, the thickness $t2$ of the barrier layer 68 is at least 0.5 micrometers, and the thickness $t1$ of the silicon-containing layer 66 is from 250 to 1500 micrometers.

Figure 3:
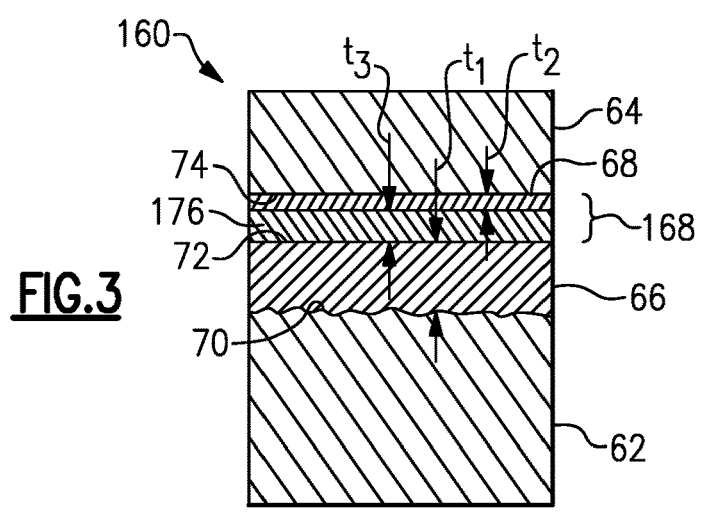
FIG. 3 illustrates another example seal system that has a silicon layer and a barrier layer.

FIG. 3 illustrates another example seal system 160 in its sealed state. In this disclosure, like reference numerals designate like elements where appropriate and reference numerals with the addition of one-hundred or multiples thereof designate modified elements that are understood to incorporate the same features and benefits of the corresponding elements. The barrier layer 168 in this example includes the barrier layer 68 as a first sub-layer, along with a second sub-layer 176 on the barrier layer 68. For example, the second sub-layer 176 is an oxide that is resistant to and acts as a barrier to silicon from layer 66 while is thermally, chemically, and mechanically compatible with Co-based and Ni-based superalloys. One example oxide includes yttria-stabilized zirconia ("YSZ"). Partially or fully stabilized zirconates, hafnates, and titanates are additional options for layer 176. In addition to enhanced function as a barrier to silicon, the YSZ of the second sub-layer 176 also provides the metallic component 64 with enhanced wear resistance, thermal resistance, and chemical resistance. YSZ is also thermally, chemically, and mechanically compatible with Co-based and Ni-based superalloys. The second sub-layer 176 may be applied by, but is not limited to, air plasma spray and physical vapor deposition. Optionally, to facilitate sealing against the silicon-containing layer 66, the second sub-layer 176 can be polished smooth to an equal or substantially equal roughness as the first surface roughness of the silicon-containing layer 66.

In further examples, the second sub-layer 176 has a third thickness ($t_3$). Generally, the first thickness $t1$ of the silicon-containing layer 66 is greater than each of the second thickness of the barrier layer 68 and the third thickness $t3$ of the second-sub-layer 176. For example, the third thickness $t3$ is from about 50 micrometers to about 510 micrometers, for example from 75 micrometers to 385 micrometers or from 125 micrometers to 254 micrometers.

Silicon-based ceramic matrix composites ("CMC") or monolithic ceramics are desirable for high temperature components in the engine 20 due to their temperature capability and low density. Components such as CMC or monolithic ceramic vanes, blades, and blade outer air seals are segmented circumferentially, and typically multiple parts make up a given row. The intersegment or mate-face gaps between these parts must be sealed in order to reduce exposure of metallic hardware to hot gas-path air ingestion. In these regards, the seal systems here may be implemented pursuant to such purposes and to control leakage of secondary airflow, which may otherwise debit engine performance.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A seal system comprising:
a ceramic component having a first surface region defining a first surface roughness;
a metallic component situated adjacent the first surface region;
a silicon-containing layer on the first surface region of the ceramic component, the silicon-containing layer having a contact surface defining a second surface roughness that is less than the first surface roughness; and
a barrier layer on the metallic component and in contact with the silicon-containing layer, the barrier layer including an oxide and being a monolayer, the silicon-containing layer having a first thickness, the barrier layer having a second thickness, the first thickness being greater than the second thickness, and the barrier layer limiting interaction between silicon of the silicon-containing layer and elements of the metallic component.

2. The seal system as recited in claim 1, wherein the oxide is selected from the group consisting of alumina and chromia.

3. The seal system as recited in claim 2, wherein the barrier layer is alumina.

4. The seal system as recited in claim 2, wherein the barrier layer is chromia.

5. The seal system as recited in claim 1, wherein the oxide is selected from the group consisting of alumina, chromia, partially or fully stabilized zirconia, hafnia, titania, and combinations thereof.

6. The seal system as recited in claim 1, wherein the oxide is selected from the group consisting of partially or fully stabilized zirconia, hafnia, titania, and combinations thereof.

7. A gas turbine engine comprising:
a compressor section;
a combustor in fluid communication with the compressor section; and
a turbine section in fluid communication with the combustor, and at least one sealing system in the turbine section or the combustor, the sealing system including:
a ceramic component having a first surface region defining a first surface roughness;
a metallic component situated adjacent the first surface region;
a silicon-containing layer on the first surface region of the ceramic component, the silicon-containing layer having a contact surface defining a second surface roughness that is less than the first surface roughness; and a barrier layer on the metallic component and in contact with the silicon-containing layer, the barrier layer including an oxide and being a monolayer, the silicon-containing layer having a first thickness, the barrier layer having a second thickness, the first thickness being greater than the second thickness, and the barrier layer limiting interaction between silicon of the silicon-containing layer and elements of the metallic component, and the barrier layer including an oxide.

8. The gas turbine engine as recited in claim 7, wherein the oxide is selected from the group consisting of alumina and chromia.

9. A seal system comprising:
a ceramic component having a first surface region defining a first surface roughness;
a metallic superalloy seal situated adjacent the first surface region;
a silicon-containing layer on the first surface region of the ceramic component, the silicon-containing layer having a contact surface defining a second surface roughness that is less than the first surface roughness; and
a barrier layer on the metallic superalloy seal, the metallic superalloy seal being moveable relative to the ceramic component such that the barrier layer can come into contact with the contact surface of the silicon-containing layer and thereby provide contact sealing, the barrier layer limiting interaction between silicon of the silicon-containing layer and elements of the metallic seal, and the barrier layer including at least one of alumina or chromia.

10. The seal system as recited in claim 9, wherein the barrier layer is a monolayer.

11. The seal system as recited in claim 9, wherein the barrier layer includes first and second sub-layers, and the first sub-layer is MCrAlY or aluminide and the second sub-layer is a partially or fully stabilized zirconia, hafnia, or titania.

12. The seal system as recited in claim 11, wherein the second sub-layer is yttria stabilized zirconia.

13. The seal system as recited in claim 11, wherein the second sub-layer is hafnia.

14. The seal system as recited in claim 11, wherein the second sub-layer is titania.

15. The seal system as recited in claim 11, wherein the silicon-containing layer has a first thickness, the first sub-layer has a second thickness, the second sub-layer has a third thickness, and the first thickness is greater than each of the first thickness and the second thickness.

* * * * *